(12) United States Patent
Jepson

(10) Patent No.: US 8,282,772 B2
(45) Date of Patent: Oct. 9, 2012

(54) METHOD AND APPARATUS FOR PROCESSING WASTEWATER

(76) Inventor: W Paul Jepson, Orlando, FL (US)

( * ) Notice: Subject to any disclaimer, the term of this patent is extended or adjusted under 35 U.S.C. 154(b) by 317 days.

(21) Appl. No.: 12/596,640

(22) PCT Filed: Apr. 18, 2008

(86) PCT No.: PCT/US2008/004987
§ 371 (c)(1),
(2), (4) Date: Oct. 19, 2009

(87) PCT Pub. No.: WO2008/130609
PCT Pub. Date: Oct. 30, 2008

(65) Prior Publication Data
US 2010/0126844 A1    May 27, 2010

(51) Int. Cl.
*B01D 1/00* (2006.01)
*B01D 53/00* (2006.01)
*C02F 1/06* (2006.01)
*F04F 1/00* (2006.01)

(52) U.S. Cl. ...... 159/47.3; 159/2.1; 159/4.01; 159/16.1; 159/48.1; 159/905; 159/DIG. 2; 159/DIG. 40; 210/151; 210/188; 210/513; 210/768; 210/774; 261/28; 261/78.1; 417/54; 417/208

(58) Field of Classification Search .............. 159/2.1, 159/4.01, 16.1, 47.3, 48.1, 905, DIG. 2, DIG. 40; 210/151, 188, 513, 768, 774; 261/28, 78.1; 417/54, 208
See application file for complete search history.

(56) References Cited

U.S. PATENT DOCUMENTS

| 4,323,424 | A | * | 4/1982 | Secunda et al. | ............. 159/48.1 |
| 5,207,928 | A | * | 5/1993 | Lerner | ........................ 210/774 |
| 5,591,310 | A | * | 1/1997 | Olrik | .............................. 203/10 |
| 6,685,802 | B1 | * | 2/2004 | Nazzer | ............................ 203/1 |
| 6,699,369 | B1 | * | 3/2004 | Hartman et al. | ................ 203/11 |
| 7,387,502 | B1 | * | 6/2008 | Rawlings et al. | ............ 417/350 |
| 2002/0088703 | A1 | * | 7/2002 | Walker | ............................ 203/2 |

* cited by examiner

*Primary Examiner* — Virginia Manoharan
(74) *Attorney, Agent, or Firm* — Larry D. Johnson

(57) ABSTRACT

A method for processing wastewater includes the steps of introducing air and a liquid into a pump, and subjecting the air and liquid to high heat and pressure; delivering the heated and pressurized air and liquid from the pump to a gas and liquid separator to separate the air from the liquid; expanding the air from the gas and liquid separator through a nozzle to accelerate the air as it expands; injecting at least some portion of the wastewater to be processed into the air from the nozzle in an entrainment section downstream from the nozzle to entrain the wastewater into the air; passing the liquid portion from the gas and liquid separator through a valve to lower the pressure of the liquid to achieve flash evaporation of the liquid to produce water and steam; introducing the water and steam produced from the valve into the air and entrained wastewater in the entrainment section, to enhance entrainment of water into the air; and delivering the air and entrained wastewater from the entrainment section to an in line gas and solid separator to separate the air and steam from waste solids.

13 Claims, 2 Drawing Sheets

METHOD AND APPARATUS FOR PROCESSING WASTEWATER

BACKGROUND OF THE INVENTION

1. Technical Field

The present invention relates generally to septic, sewer, grease, and wastewater processing, and more particularly to an improved method and apparatus for processing wastewater.

2. Background Art

U.S. Pat. No. 3,956,126 to Streebin, et al. discloses an apparatus for efficiently disposing of combustible organic waste materials, such as organic industrial and household wastes, comprising a macerator and an evaporation unit where liquids are removed from the waste to leave a concentrated organic residue. Evaporation of liquids from the waste is accomplished by heat exchange with a medium heated, in part, by exhaust gases from an internal combustion engine, and in part by incineration of the solid, relatively dry organic residue. The liquids from the evaporation unit are preferably condensed to a suitable liquid form for subsequent use, and the concentrate remaining after liquid evaporation is introduced to a high temperature zone developed in the course of the operation of an internal combustion engine, so that the solid organic residue is incinerated to a relatively small quantity of ash and innocuous gases. Heat for the purpose of partially heating the heat exchange medium used in the evaporation unit is developed in the course of such incineration.

U.S. Pat. No. 4,217,700 to Muller describes a process for drying solid residues obtained in filtration processes, in which the residue is first dried by passing a gas through it while it is still on the filter elements, and then whirl drying the residue in a lower portion of the reaction vessel. A system in which the drying gas is circulated is described. This results in a process which permits the preparation of dry filter residues which are easily transportable and avoids problems of separation from the filter elements while still wet.

U.S. Pat. No. 4,219,415 to Nassef, et al. teaches a method and apparatus for disposing of aqueous organic wastes by filtration and microwave irradiation. The aqueous organic waste is placed on a moving activated carbon filter bed, and during the bed movement, the liquid in the waste is substantially separated from the solid organic matter. In the course of separation, and during movement of bed, both the liquid and the organic solid matter are irradiated with microwaves and are thereby stabilized and sterilized. A portion of the sterilized organic solid residue is stored, and is subsequently converted to activated carbon to be used in the filter bed. The apparatus of the invention includes a rotary porous disc supported over a bed of activated carbon which is rotatable with the disc. A source of microwaves is positioned over one side of the disc for irradiating material on the disc and the activated carbon in the bed. A liquid collection device is positioned under the activated carbon bed for catching and storing liquid which has drained through the porous disc in the activated carbon bed after the liquid has been microwave irradiated. A solids removal device is positioned over the disc for removing sterilized solids therefrom and transferring them to a pyrolysis/incineration unit. Means is provided for irradiating the sterilized organic solid residue in the incineration unit to convert it to activated carbon, or to effect a reduction thereof to gases and a small ash residue.

U.S. Pat. No. 4,836,934 to Homer discloses a system for removing liquid from slurries of liquid and particulate material. In order to separate liquids from slurries containing particulate material, and particularly from slurries of water and spent ion exchange materials which are used for water conditioning in the operation of nuclear power plants and must be disposed of without any significant volume of free standing water therein, a vessel is provided which is filled with the slurry. The bottom of the vessel is conical and defines a region for the collection of water which passes thereto radially through a structure which filters the water and supports a bed of the particulate material thereon. A discharge tube extends longitudinally of the vessel into the region. A level sensor is disposed alongside the tube. A passage into the top of the vessel is provided for blowing air through the bed to force interstitial water through the bed into the region. A system of pumps and blowers is operated in accordance with the level of liquid and solid material in the vessel so as to provide for discharge of the liquid collected in the region, the formation of a tightly packed bed of particulate material and the blowing of air through the bed after substantially all the water has been discharged so as to free additional water and enable it to be discharged, thereby removing the liquid from the slurry and de-watering the material in a relatively short period of time to the extent required by governmental regulations for the disposal of low level radioactive waste materials, for example in eight hours, and providing efficient utilization of the volume of the vessel in preparation for storage.

U.S. Pat. No. 4,952,339 to Temus, et al. describes a method of predictably dewatering a slurry that contains radioactive particles to a condition for safe permanent storage. Interstitial water is removed from the slurry, and then a sufficient quantity of adsorbed water is removed from the particles so that at the permanent storage temperature the particles will be just unsaturated with respect to adsorbed water. The dewatering endpoint is set to at least unsaturate the particles at the permanent storage temperature. This minimum volume of adsorbed water removal is necessary to assure the subsequent uptake of any condensed water that develops during storage in a sealed container. An upper dewatering endpoint is preferably set so that the volume of adsorbed water removed from the particles does not excessively unsaturate the particles, so that the sealed storage container that eventually confines the dewatered particles will not burst if the particles later become exposed to ambient water or water vapor. This upper dewatering limit is both particle- and container-specific and is set to assure that any increase in particle volume, if the particular particles become further hydrated at the permanent storage temperature, will not exceed the volume of compressible gas, typically air but alternatively an inert gas, in the particular container. Systems and apparatuses for dewatering nuclear wastes are also provided. In one embodiment, a disposable container with a top region and a bottom region is provided with a waste influent port for introducing a slurry of radioactive particles into the container bottom region and with an air inlet port for introducing relatively dry air into the container top region. A vapor collector manifold is selectively disposed in the container bottom region to draw air uniformly through the particle bed. A vapor outlet port, connected to the vapor collector manifold, is provided to remove the humidified air that has passed through the particle bed from the container.

U.S. Pat. No. 5,219,468 to Olson teaches a method for dewatering using addition of water to facilitate material movement. A liquid separator apparatus extracts liquid, usually water, from a water-solids mixture. The apparatus includes liquid separator device with a housing with an inlet and an outlet separated by a liquid extraction chamber. The housing sidewalls defining the extraction chamber are porous, and are preferably comprised as a plurality of spaced apart slats. The slats can be movable inwardly and outwardly relative to the housing in order to vary the volume of the extraction chamber. A transfer pipe has an outlet end connected to the inlet of the separator device. The transfer pipe is closed-walled and has an inlet end connectable to a solids material moving apparatus such as a solids pump for movement of a water-solids mixture through the transfer pipe into the liquid separator device. A source of air under pressure such as an air compressor introduces compressed air into a side wall of the transfer pipe to accelerate removal of water from the water-solids mixture.

U.S. Pat. No. 5,426,866 to Rumocki discloses a method and apparatus for dewatering of sludges. In order to considerably reduce expenditures for the dewatering of sludges, particularly from sewage treatment facilities, and thereby perform the step from a sticky, wet solid to a flowable solid granulate practically without the re-admixture of material, it is proposed to employ a solid bowl sludge centrifuge as the dispersing member in a subsequently connected convection dryer for further dewatering of the wet solids particles that are ejected with a dry substance content of approximately 25-35 weight percent. The wet solids particles that are ejected at high speed in the form of a film of particles from the outlet of the solid bowl sludge centrifuge are surrounded by the hot drying gas while still on their trajectory and are pre-dried to a dry substance content of approximately 65 weight percent.

U.S. Pat. No. 5,736,007 to Duffy describes a method of liquor removal from particulate solids. Liquor removal from particulate solids such as wet wood pulp is achieved by applying a pneumatic or vapor pressure force through a pad of the wood pulp to compress the solids and to expel liquor from the solids. If air is used as a displacing medium, no wash liquor is added and the solids are simply compressed and some of the liquor is replaced by the gas passing through the suspension. If steam is used, not as a heating medium but as a pressure medium, an increase in liquor removal occurs over and above that removed by gas only due to the condensation of the steam to form a liquid front traveling before the steam through the solid suspension. Hence, in principle, a combination of pressure washing and displacement occurs resulting in a high efficiency in washing. Gas or steam could therefore simply be applied to any conventional operation to increase the washing efficiency both by compression and by displacement.

U.S. Pat. No. 6,106,703 to Nassef teaches a waste treatment system for use on a vehicle having an exhaust manifold, the waste treatment system comprising a holding tank for receiving waste from a head, a galley, a shower or a bilge tank. At least one macerator is connected to the holding tank such that the macerator grinds the waste from the holding tank and recirculates it, as appropriate. A reducer is connected to the at least one macerator for reducing the size of the output of the at least one macerator. A centrifugal separator separates the relatively large waste particles coming from the reducer from the relatively small waste particles and liquid waste and recirculates the relatively large particles back to the holding tank. The remaining particles are sent to an injector pump that injects the waste, through an injector nozzle, into the exhaust manifold of the vessel. A control module controls the operation of the system based on various parameters, the parameters derived from various sensors.

U.S. Pat. No. 6,256,902 to Flaherty, et al. discloses an apparatus and method for drying and deagglomerating substances of finely-divided solids suspended in a fluid medium. The apparatus includes the basic components of a pneumatic friction dryer, a flash dryer and a ring dryer.

U.S. Pat. No. 6,905,609 to Nassef describes a waste treatment and disposal system for sanitary, petroleum, and other organic wastes. The invention treats and disposes of these types of waste from portable and remote waste generating sources, such as passenger carrying vehicles and remote facilities where sewage and septic systems are impractical. The invention makes use of thermal energy liberated from devices that generate a hot exhaust stream, such as internal combustion engines. The invention generally involves the passing of a waste material from a tank through a homogenizing device. The homogenizing device reduces the particle size and thoroughly mixes the waste stream so that it may be injected into a hot exhaust stream, which converts the waste stream into water vapor, gas and inert ash.

United States Patent Application 20040050802 by Banister, et al. teaches a filter-dryer apparatus employing a single container for both filtering and drying operations including a container holding a material to be filtered and dried, adapted to connect to a filter system and to connect to a fluid bed dryer system, and a process for separating particulates from liquids by the operations of filtration and drying, which includes the steps of providing a single container for both filtering and drying operations; introducing a mixture of particles and liquid to said container; connecting the container to a filter system and filtering the particulates from the liquid; detaching the container from the filter system; connecting the container to a fluid bed drying system and removing the liquid from the particulates to result in dry particulates.

The foregoing patents and application reflect the current state of the art of which the present inventor is aware. Reference to, and discussion of, these patents and application is intended to aid in discharging Applicant's acknowledged duty of candor in disclosing information that may be relevant to the examination of claims to the present invention. However, it is respectfully submitted that none of the above-indicated patents and application disclose, teach, suggest, show, or otherwise render obvious, either singly or when considered in combination, the invention described and claimed herein.

DISCLOSURE OF INVENTION

The present invention provides an improved method and apparatus for processing wastewater. A first preferred embodiment of the inventive apparatus includes a pump such as a progressive cavity pump driven by a motor, a gas/liquid separator such as a gravity separator, a liquid entrainment section such as a serpentine coil, and a final in-line gas/solid separator to separate the air stream and solids. The inventive method includes introducing air and a liquid (such as a portion (e.g., 20-50%) of the liquid or effluent to be treated, or other lubricating liquid) into the progressive cavity pump, where they are subject to high heat and pressure (e.g., 300 degrees F. and 300 psi), and then delivered to the gas/liquid separator to separate the hot air from the hot liquid. The hot compressed air from the gas/liquid separator is then expanded through a nozzle to atmospheric pressure. This has the effect of increasing volume and hence velocity. The balance of the liquid to be treated is injected into this high velocity hot air stream in the serpentine coil section just downstream from the nozzle, where the liquid is entrained into the stream. Shear forces at the wall of the coil break down the solids in the stream into very small particles, and mixes them with the air. The hot liquid portion from the gas/liquid separator passes through a valve to lower the high pressure liquid to at or near atmospheric pressure, thereby achieving flash evaporation of the hot, high pressure liquid to produce hot water and hot steam. This hot water/steam is then reintroduced into the hot air/effluent stream in the coil, to further enhance entrainment of water into the air. This recombined stream is then delivered to the in-line gas/solid separator, where the wet air and steam can be vented to the atmosphere, and the waste solids are collected in a hopper or other vessel.

It is therefore an object of the present invention to provide a new and improved method for processing wastewater.

It is another object of the present invention to provide a new and improved apparatus for separating solids from an effluent.

A further object or feature of the present invention is a new and improved method to treat septic, sewer, grease, and wastewater materials.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the international, regional, and national patent office(s) and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

BEST MODE FOR CARRYING OUT THE INVENTION

Figure 1:
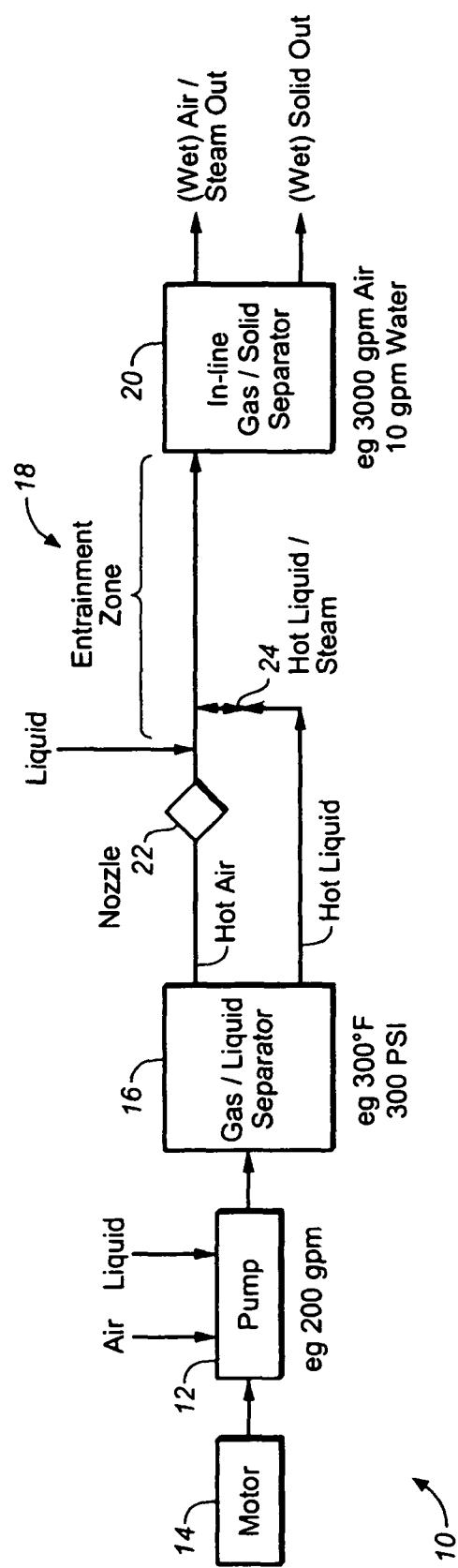
FIG. 1 is a schematic view of a first preferred embodiment of a wastewater processing apparatus of this invention.

FIG. 1 is a schematic view of a first preferred embodiment of a wastewater processing apparatus 10 of this invention. The apparatus 10 includes a pump such as a progressive cavity pump 12 (or other pump achieving the desired hot, pressurized gas/liquid ouput) driven by a motor 14, a gas/liquid separator such as a gravity separator 16, a liquid entrainment section such as a serpentine coil 18, and a final in-line gas/solid separator 20 to separate the air stream and solids. The inventive method includes introducing air and a liquid (such as a portion (e.g., 20-50%) of the liquid or effluent to be treated, or other lubricating liquid) into the progressive cavity pump 12 (e.g., 200 gpm), where they are subject to high heat and pressure (e.g., 300 degrees F. and 300 psi), and then delivered to the gas/liquid separator 16 to separate the hot air from the hot liquid. The hot compressed air from the gas/liquid separator is then expanded through a nozzle 22 to atmospheric pressure. This has the effect of increasing volume and hence velocity. The balance of the liquid to be treated is injected into this high velocity hot air stream in the serpentine coil section 18 just downstream from the nozzle 22, where the liquid is entrained into the stream. Shear forces at the wall of the coil break down the solids in the stream into very small particles, and mixes them with the air. The hot liquid portion from the gas/liquid separator 16 passes through a valve 24 to lower the high pressure liquid to at or near atmospheric pressure, thereby achieving flash evaporation of the hot, high pressure liquid to produce hot water and hot steam. This hot water/steam is then reintroduced into the hot air/effluent stream in the coil 18, to further enhance entrainment of water into the air. The overall length of the coil section is preferably 200-300 pipe diameters (e.g., twenty feet) to achieve complete entrainment of the liquid into the air. This recombined stream is then delivered to the in-line gas/solid separator 20 (e.g., 3000 gpm air, 10 gpm water), where the wet air and steam can be vented to the atmosphere, and the waste solids are collected in a hopper or other vessel. The wet air/steam can alternatively be filtered or delivered to a condenser for further drying if necessary or appropriate. Similarly, the waste solids can be dried in a hydrocyclone or other apparatus as necessary.

Figure 2:
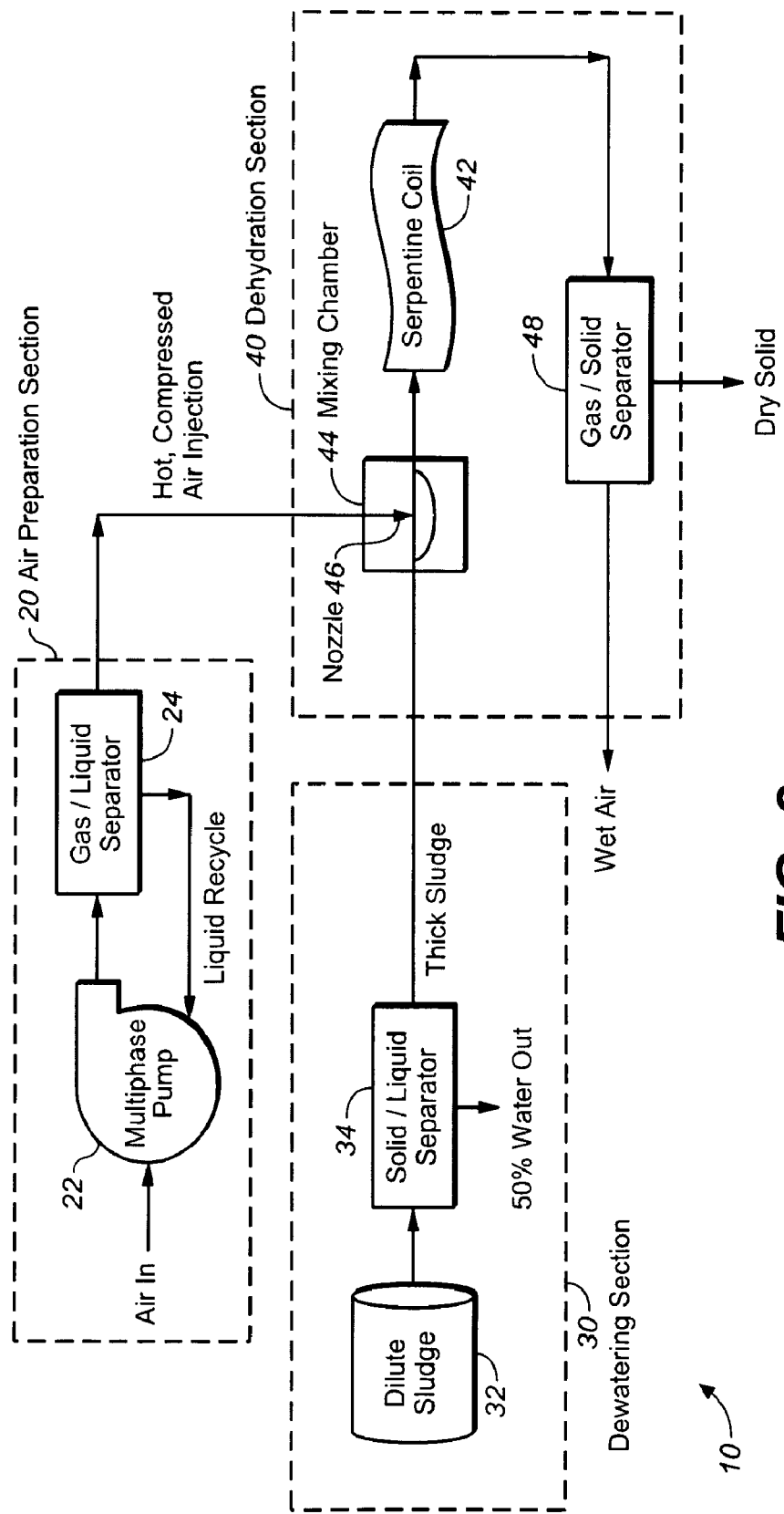
FIG. 2 illustrates a second preferred embodiment of the method and apparatus for processing wastewater of this invention.

FIG. 2 illustrates a second preferred embodiment of the method and apparatus for processing wastewater of this invention. The process is not a single unit but a combination of several sections:

Section 1. Air Preparation Section 120: To remove liquid from the solid slurry, hot, compressed air is needed with low humidity. The air preparation section includes a multiphase pump 122 and a special, inline, compact gas/liquid separator 124. The multiphase pump rotor and stator are lubricated with a small amount of liquid (e.g. <2% liquid). When the pump is lubricated, air is drawn in and compressed to at least 150 psig. The compression process increases the temperature of the gas and this can range from 40 to 150 C. At the lower temperatures, the air is hot and has a given level of humidity. At the higher temperatures, the air is above the saturation temperature of the liquid. After the pump, the novel gas/liquid separator 124 removes the liquid lubricant and this is recycled to the pump inlet. The liquid free gas then passes to the dehydration section.

Section 2. Dewatering Section 130/Initial Concentration of the Slurry: The dilute sludge is taken from a storage tank or mobile tanker 132 and passed into a compact, inline solid/liquid separator 134. Here at least 50% of the liquid is removed. The liquid has little or no solids and could be readily disposed of via a sewer or other means. If there were a small amount of contaminants, a secondary treatment unit could be used prior to disposal. The thick sludge is then pumped to the dehydration section.

Section 3. Dehydration Section 140: This consists of a serpentine coil 142 and an upstream mixing chamber 144. The mixing chamber 144 takes the hot compressed air from the air preparation section 120 and passes it to a specially designed inlet nozzle 146. This accelerates the air to high velocities, e.g. up to 100 m/s as the air expands. The concentrated sludge is injected just downstream of the nozzle where it is entrained in the fast moving gas stream. The mixture is forced to the outer surface of the coil 142 and the large shear forces at the wall break down the sludge into very small particles, as well as intimately mixing the air with the particles. Due to the very large surface area of the solids, most of the liquid is taken into the air. As the mixture leaves the coil 142, is allowed to expand into a gas/solid inline separator 148. Here, the cooler, wet air is vented to the atmosphere and the dry solids are collected in a hopper or closed vessel. If there are toxic materials in the air stream, a secondary scrubbing system or incinerator can be installed. The solids will typically have a particle size of less than 10 microns.

The foregoing disclosure is sufficient to enable one having skill in the art to practice the invention without undue experimentation, and provides the best mode of practicing the invention presently contemplated by the inventor. While there is provided herein a full and complete disclosure of the preferred embodiments of this invention, it is not intended to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A method for processing wastewater, said method comprising the steps of:
    introducing air and a liquid into a pump, and subjecting the air and liquid to high heat and pressure;
    delivering heated and pressurized air and liquid from the pump to a gas and liquid separator to separate the air from the liquid;
    expanding the air from the gas and liquid separator through a nozzle to accelerate the air as it expands;
    injecting at least some portion of the wastewater to be processed into the air from the nozzle in an entrainment section downstream from the nozzle to entrain the wastewater into the air;
    passing the liquid portion from the gas and liquid separator through a valve to lower the pressure of the liquid to achieve flash evaporation of the liquid to produce water and steam;
    introducing the water and steam produced from the valve into the air and entrained wastewater in the entrainment section, to enhance entrainment of water into the air; and
    delivering the air and entrained wastewater from the entrainment section to an in line gas and solid separator to separate the air and steam from waste solids.

2. The method for processing wastewater of claim 1 wherein the step of introducing air and a liquid into a pump comprises introducing a portion of the wastewater to be processed into the pump.

3. The method for processing wastewater of claim 1 wherein the step of introducing air and a liquid into a pump comprises introducing a lubricating liquid into the pump.

4. The method for processing wastewater of claim 1 wherein the step of introducing air and a liquid into a pump comprises introducing air and a liquid into a progressive cavity pump.

5. The method for processing wastewater of claim 1 further including the step of collecting the waste solids in a vessel.

6. The method for processing wastewater of claim 1 wherein the step of expanding the air from the gas and liquid separator a nozzle comprises expanding the air to atmospheric pressure.

7. The method for processing wastewater of claim 1 wherein the step of passing the liquid portion from the gas and liquid separator through a valve to lower the pressure of the liquid comprises lowering the pressure of the liquid to atmospheric pressure.

8. The method for processing wastewater of claim 1 wherein the step of delivering the air and entrained wastewater from the entrainment section to an in line gas and solid separator to separate the air and steam from waste solids further includes the step of venting the air and steam to the atmosphere.

9. A wastewater processing apparatus comprising:
    a pump to subject air and a liquid introduced into said pump to high heat and pressure;
    a gas and liquid separator connected to said pump to separate the heated and pressurized air from the heated and pressurized liquid;
    a nozzle connected to said gas and liquid separator to expand and accelerate the air from said gas and liquid separator;
    an entrainment section connected to said nozzle to entrain the wastewater to be processed into the air from said nozzle;
    a valve connected between said gas and liquid separator and said entrainment section to lower the pressure of the liquid from said gas and liquid separator to achieve flash evaporation of the liquid to produce water and steam, and deliver the water and steam into the air and entrained wastewater in said entrainment section; and
    an in line gas and solid separator connected to said entrainment section to separate the air and steam from waste solids.

10. The wastewater processing apparatus of claim 9 wherein said pump comprises a progressive cavity pump.

11. The wastewater processing apparatus of claim 9 wherein said in line gas and solid separator includes a vessel for storage of the waste solids.

12. The wastewater processing apparatus of claim 9 wherein said entrainment section comprises a serpentine coil.

13. The wastewater processing apparatus of claim 9 wherein said gas and liquid separator comprises a gravity separator.

* * * * *